United States Patent
Lee et al.

(10) Patent No.: US 9,101,243 B2
(45) Date of Patent: Aug. 11, 2015

(54) UNIVERSAL ESPRESSO MAKER

(75) Inventors: Thomas M. Lee, Coto de Caza, CA (US); Abdelaziz Boubeddi, Hoofddorp (NL); Timothy C. Morse, Aliso Viejo, CA (US)

(73) Assignee: The Richards Corporation, Sterling, VA (US)

( * ) Notice: Subject to any disclaimer, the term of this patent is extended or adjusted under 35 U.S.C. 154(b) by 212 days.

(21) Appl. No.: 13/480,588

(22) Filed: May 25, 2012

(65) Prior Publication Data

US 2012/0297987 A1    Nov. 29, 2012

Related U.S. Application Data

(60) Provisional application No. 61/490,293, filed on May 26, 2011.

(51) Int. Cl.
| | |
|---|---|
| *A47J 31/42* | (2006.01) |
| *A47J 31/00* | (2006.01) |
| *A47J 31/44* | (2006.01) |
| *A47J 31/06* | (2006.01) |
| *A47J 31/36* | (2006.01) |

(52) U.S. Cl.
CPC .......... *A47J 31/0684* (2013.01); *A47J 31/0663* (2013.01); *A47J 31/0668* (2013.01); *A47J 31/3685* (2013.01); *A47J 31/446* (2013.01)

(58) Field of Classification Search
CPC .................................. A47J 31/42; A47J 31/46
USPC ............................................ 99/286, 295, 300
See application file for complete search history.

(56) References Cited

U.S. PATENT DOCUMENTS

| | | | |
|---|---|---|---|
| 3,793,935 | A | 2/1974 | Martin |
| 3,975,996 | A | 8/1976 | Vitous |
| 4,429,623 | A | 2/1984 | Illy |
| 5,638,741 | A | 6/1997 | Cisaria |
| 6,431,055 | B2 | 8/2002 | Bonanno |

(Continued)

FOREIGN PATENT DOCUMENTS

| | | |
|---|---|---|
| EP | 1518484 B1 | 3/2005 |
| EP | 1541070 B1 | 6/2005 |

(Continued)

OTHER PUBLICATIONS

Keurig Web Site http://www.keurig.com One page Date accessed Aug. 27, 2012.

(Continued)

*Primary Examiner* — Dana Ross
*Assistant Examiner* — Lindsey C Teaters
(74) *Attorney, Agent, or Firm* — Kilpatrick Townsend & Stockton LLP; Dean W. Russell; Kristin M. Crall (57) ABSTRACT

Embodiments of the present invention relate generally to an espresso or other coffee drink maker that is configured to accept a number of different forms of coffee grounds. It may accept powder/coffee grounds that are loose, coffee capsules, coffee pods, (e.g., "ESE" (easy serving espresso) pods), or any other format. The machine may also be provided with an optional built-in grinder, which allows the machine to accept fresh coffee beans, in order to grind and brew them on-site, in a single machine. Such espresso/coffee drink makers find particular use on-board passenger transport vehicles such as aircraft, but may be useful in a number of other locations.

15 Claims, 13 Drawing Sheets

(56) References Cited

U.S. PATENT DOCUMENTS

| | | |
|---|---|---|
| 6,779,435 B1 | 8/2004 | Iacobucci |
| 6,805,042 B2 | 10/2004 | Mordini et al. |
| 6,843,165 B2 | 1/2005 | Stoner |
| 6,990,891 B2 | 1/2006 | Tebo |
| 7,081,263 B2 | 7/2006 | Albrecht |
| 7,093,530 B2 | 8/2006 | Meister et al. |
| 7,213,505 B2 | 5/2007 | Kollep |
| 7,217,908 B2 | 5/2007 | Orrico et al. |
| 7,223,427 B2 | 5/2007 | Knepler |
| 7,270,050 B2 | 9/2007 | Glucksman et al. |
| 7,325,479 B2 | 2/2008 | Laigneau et al. |
| 7,444,925 B2 | 11/2008 | Mahlich |
| 7,487,712 B2 | 2/2009 | Bowden et al. |
| 7,540,232 B2 | 6/2009 | Bates et al. |
| 7,644,650 B2 | 1/2010 | Suzuki |
| 7,644,653 B2 | 1/2010 | Bates |
| 7,677,158 B2 | 3/2010 | McDuffie et al. |
| 7,698,992 B2 | 4/2010 | Wei et al. |
| 7,806,043 B2 | 10/2010 | Zanetti |
| 7,997,187 B2 | 8/2011 | Garman et al. |
| 8,028,616 B2 | 10/2011 | Van Der Meer et al. |
| 8,062,682 B2 | 11/2011 | Mandralis et al. |
| 8,069,775 B2 | 12/2011 | Russo |
| 8,087,347 B2 | 1/2012 | Halliday et al. |
| 8,088,423 B2 | 1/2012 | Ohresser et al. |
| 8,109,200 B2 | 2/2012 | Hansen |
| 8,113,107 B2 | 2/2012 | Fraij et al. |
| 2002/0048621 A1 | 4/2002 | Boyd et al. |
| 2004/0055472 A1 | 3/2004 | Stoner |
| 2005/0109214 A1 | 5/2005 | Bruttin et al. |
| 2006/0174779 A1 | 8/2006 | Ng |
| 2008/0115675 A1 | 5/2008 | Suggi Liverani et al. |
| 2008/0121111 A1* | 5/2008 | Paget et al. ............... 99/295 |
| 2009/0173236 A1* | 7/2009 | Wang ....................... 99/280 |
| 2009/0285953 A1 | 11/2009 | Renieris |
| 2009/0285966 A1 | 11/2009 | Tso et al. |
| 2011/0061542 A1 | 3/2011 | Jimenez et al. |
| 2011/0100228 A1 | 5/2011 | Rivera |
| 2011/0168029 A1 | 7/2011 | Fulco |
| 2011/0274802 A1 | 11/2011 | Rivera |

FOREIGN PATENT DOCUMENTS

| | | |
|---|---|---|
| EP | 1547498 A1 | 6/2005 |
| EP | 1796516 A2 | 2/2006 |
| EP | 1868473 B1 | 10/2010 |
| EP | 2409609 A1 | 1/2012 |
| WO | 2006014936 | 2/2006 |
| WO | 2006126104 A2 | 11/2006 |
| WO | 2010092542 A1 | 8/2010 |
| WO | 2011101712 A1 | 8/2011 |

OTHER PUBLICATIONS

Nespresso Web Site http://www.nespresso-us.com/machines/ Two pages Date accessed Aug. 27, 2012.
Aerolux Web Site http:www.aerolux.co.uk/beveragemakers.html One page Date accesseed Aug. 27, 2012.
International Search Report and Written Opinion dated Sep. 13, 2012 in related Application No. PCT/US2012/039525.
International Preliminary Report on Patentability dated Dec. 5, 2013 in related Application No. PCT/US2012/039525.

* cited by examiner

UNIVERSAL ESPRESSO MAKER

CROSS REFERENCE TO RELATED APPLICATIONS

This application claims the benefit of U.S. Provisional Application Ser. No. 61/490,293, filed May 26, 2011, titled "Universal Espresso Maker," the entire contents of which are hereby incorporated by reference.

FIELD OF THE INVENTION

Embodiments of the present invention relate generally to an espresso or other coffee drink maker that is configured to accept a number of different forms of espresso powder and/or coffee grounds. It may accept powder/coffee grounds, coffee capsules, coffee pods, (e.g., "ESE" (easy serving espresso) pods), or any other format, including loose coffee grounds. The machine may also be provided with an optional built-in grinder, which allows the machine to accept fresh coffee beans, in order to grind and brew them on-site, in a single machine. Such espresso/coffee drink makers find particular use on-board passenger transport vehicles such as aircraft, but may be useful in a number of other locations.

BACKGROUND

Espresso makers typically force very hot water through tightly packed and very fine espresso powder/coffee grounds. Varying the fineness of the grind, the amount of pressure used to tamp the powder/grounds, or the pressure of the water itself can be used to vary the taste of the espresso. Steam-driven units operate by forcing water through the coffee by using steam or steam pressure. Piston (or lever)-driven machines use a lever, pumped by the operator, to pressurize hot water and send it through the coffee grounds. Lever machines may either by manual piston or by spring piston design. Pump-driven machines operate by a motor-driven or solenoid-driven pump that provides the force necessary for espresso brewing. Some pump-driven machines use a single chamber to both heat the water to the desired brewing temperature and to boil water for frothing milk. Other machines use a single boiler kept at steaming temperature, but water for brewing is passed through a heat exchanger, taking some heat from the steam without rising to the same temperature. Other machines heat water in a separate chamber, which requires two separate boilers, and are referred to as "dual boiler" or "dual heater" machines. In recent years, air-pump driven espresso machines have also been developed, which use compressed air to force the hot water through the coffee grounds (the compressed air comes from either a hand-pump, N20 or CO2 cartridges or an electric compressor). Traditional coffee machines also cause hot water to interact with coffee grounds, and may do so via percolation, drip methods, or french pressing. Improvements to espresso machines and other coffee drink makers continue to be made, and any of the embodiments described herein are intended for use with any of these various types of machines.

Many espresso and coffee drink makers, such as for commercial use, high-end home use, and for use on-board aircraft (or other passenger transport vehicles), are attached directly to the water plumbing of the site or vehicle. This allows the machine to pull as much water as needed from large water tanks so that it is able to brew without being manually refilled. Other designs have built-in water reservoirs that are to be periodically refilled. The embodiments described herein may be used with either of these types of machines.

One feature common to most espresso and coffee drink makers is that they are designed to accept one particular form of powder/coffee grounds. For example, some machines are designed for particular use with certain brands or styles of capsules or pods, or only for use with loose coffee grounds. These machines have internal features that are specifically shaped to hold the particular brand or style of capsule, pod, or loose grounds in order to force water therethough and to create the desired espresso or other coffee drink. For example, a certain brand X machine may be designed for use only with brand X capsules or cups. This can limit the end user or consumer to purchasing only the coffee pods, capsules, or cups that work with the particular purchased machine. For example, if an airline wishes to offer espresso or cappuccino on-board its aircraft, the airline typically selects the coffee form it desires (e.g., a particular brand of pods or capsules or easy serving espresso pods), and then installs the appropriate machines on its fleet.

However, when these machines are purchased in bulk to be installed on a fleet of aircraft, for example, being limited to one form of coffee capsule or pod can be disadvantageous in a number of instances. For example, an aircraft may not wish to be locked into only one supplier for the life of the aircraft fleet that has been fitted with a particular machine brand. A supplier may raise costs to a prohibitive level, may discontinue particular flavors, may change the shape or form of their product packaging, or may not offer options that are green or recyclable, conflicting with a company's desire or mission to be environmentally friendly. There are a number of other reasons why a particular airline may desire interchangeability and flexibility in the types of coffee and espresso it serves. Although the desire for interchangeability has been described with respect to airlines/aircraft usage, it should be understood that there are other instances when interchangeability may also be desired. For example, a particular company or restaurant with multi-office sites may wish to purchase one type of machine for all locations, but to have long-term flexibility on coffee suppliers or interchangeability at individual sites.

Accordingly, it is desirable to provide a universal espresso or other coffee drink maker that provides this interchangeability between variously-packaged coffee grounds.

BRIEF SUMMARY

Embodiments of the invention described herein thus provide an espresso or other coffee drink maker that is configured to accept a number of different forms of espresso powder and/or coffee grounds. The machine may also be provided with an optional built-in grinder, which allows the machine to accept fresh coffee beans, in order to grind and brew them on-site, in a single machine. Such espresso/coffee drink makers find particular use on-board passenger transport vehicles such as aircraft, but may be useful in a number of other locations.

DETAILED DESCRIPTION

Embodiments of the present invention provide a espresso or coffee drink maker/machine that can be used with multiple brewing interfaces. The machine has a base component 12, which may be an upper built-in or permanent component that is designed to receive water. This component 12 is not intended to be interchangeable. It receives water via a water path 14, which may be in communication with a water source. For example, if the machine is installed on-board a passenger transport vehicle, such as an aircraft, the water path 14 is generally in fluid communication with the aircraft potable water tank(s), and the base 12 is secured installed in the aircraft galley. If the machine is installed or for use in a residential or commercial location, water path 14 may be in communication with the building water source. Alternatively, water path 14 may receive water that is poured into a water-receiving/holding area (not shown) on the machine.

As shown in FIGS. 1-5, component 12 has an interface connection 16. Interface connection 16 is shaped and configured to cooperate and secure a brewing interface component 18. Brewing interface component 18 has a securing feature 20 that corresponds to the interface connection 16. For example, FIGS. 1 and 3-5 show interface connection 16 being formed as an angled dovetail indentation and the securing feature 20 formed as a corresponding angled dovetail protrusion. It should be understood that alternate cooperating shapes and configurations are possible for these elements 16, 20 and that their locations may be interchanged between components 12 and 18. (For example, the protrusion could be positioned on either of the components 12, 18 and the indentation could be positioned on the other of the components 12, 18.) Additionally, interface connection 16 and securing feature 20 may comprise threads and receiving spirals that are screwed to one another, a lever lock securement, holes that are aligned and connected via screws, a ball and detent receiver, or any other appropriate securing feature that will maintain interchangeability but allow the two components 12, 18 to be securely connected in use.

In use, the securing feature 20 cooperates with interface connection 16 in order to secure the brewing interface component 18 to the base component 12. The brewing interface component 18 may either slide into place, be screwed into place (either via cooperation between threaded components 12, 18 or via holes in the components that receive separate screws), be lever-locked into place, or be secured in any other appropriate way that can withstand the heat and pressure of hot water being forced between the connection of components 12, 18.

If desired, a seal 22, such as an O-ring seal, spring energized seal, or other sealing means, may be provided on either of components 12, 18 in order to help maintain a water-tight connection therebetween. In use, water passes from the water path 14, past the connection between components 12, 18 and into the brewing interface component 18.

Figure 4:
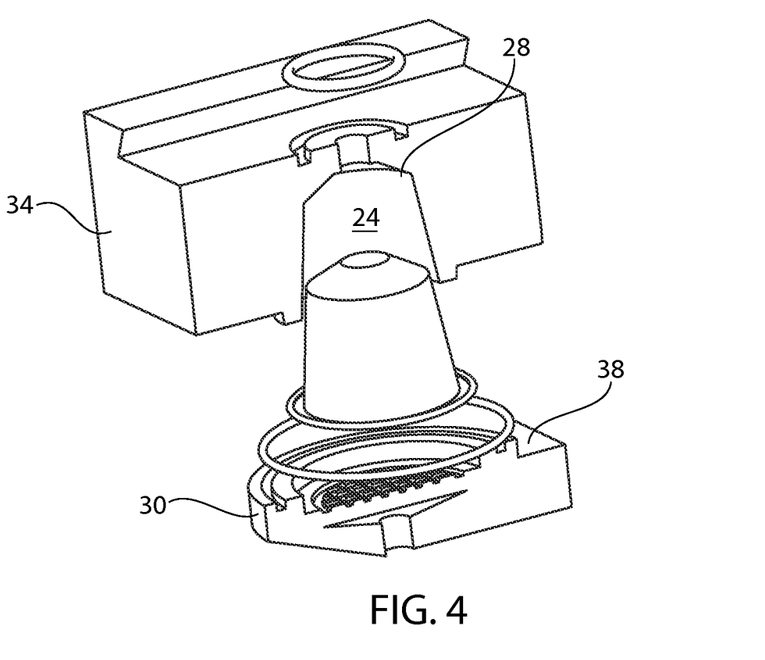
FIG. 4 shows an exploded view, indicating the location of seals and grid.
Figure 5:
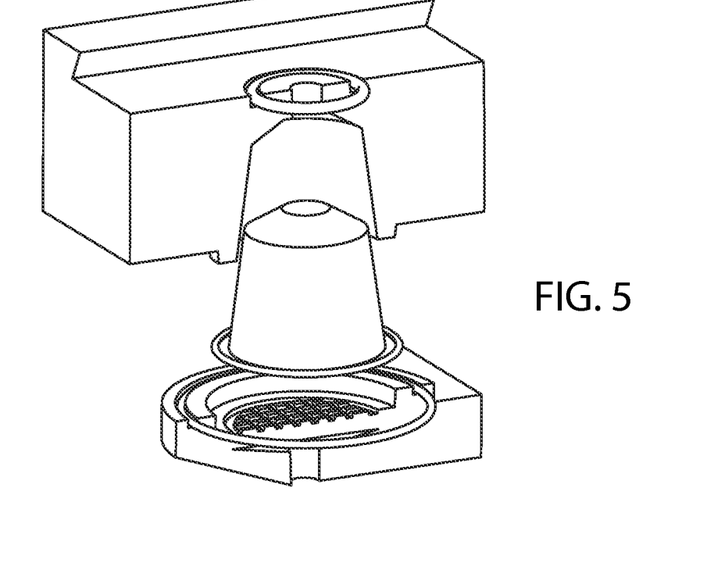
FIG. 5 shows the view of FIG. 4 with the seals positioned.

Referring now to the brewing interface component 18, in addition to securing feature 20, component 18 has a holder portion 24. The holder portion 24 is generally designed to receive a particularly-shaped capsule 26 for holding espresso or other coffee grounds. As shown in FIG. 4, the capsule 26 may have an angled upper portion, and the holder portion 24 may be designed to have a corresponding angled upper portion 28 that matches that of the pod 26 so that the pod can securely fit into holder portion 24.

Figure 6:
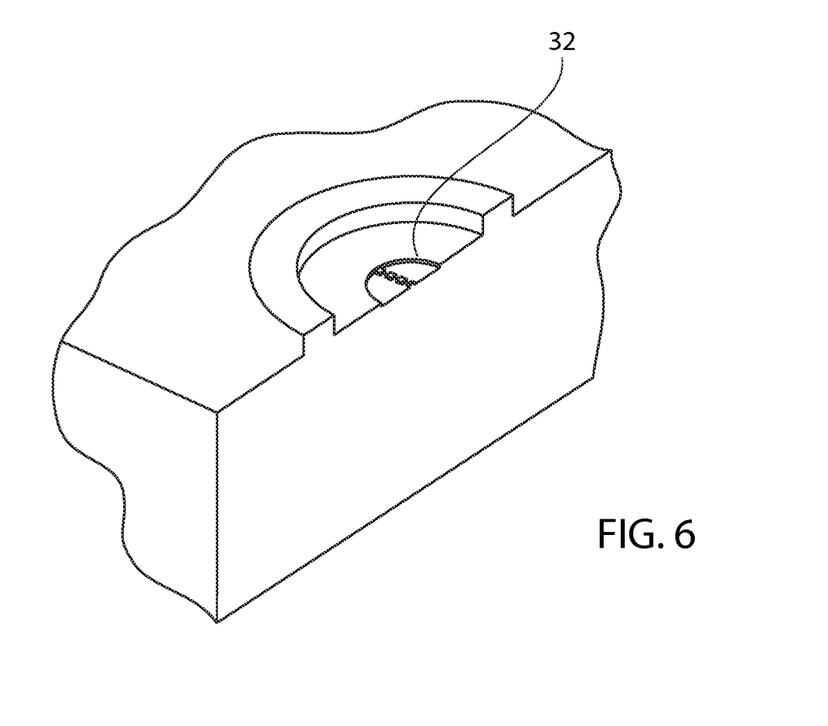
FIG. 6 shows an alternate grid embodiment.
Figure 7:
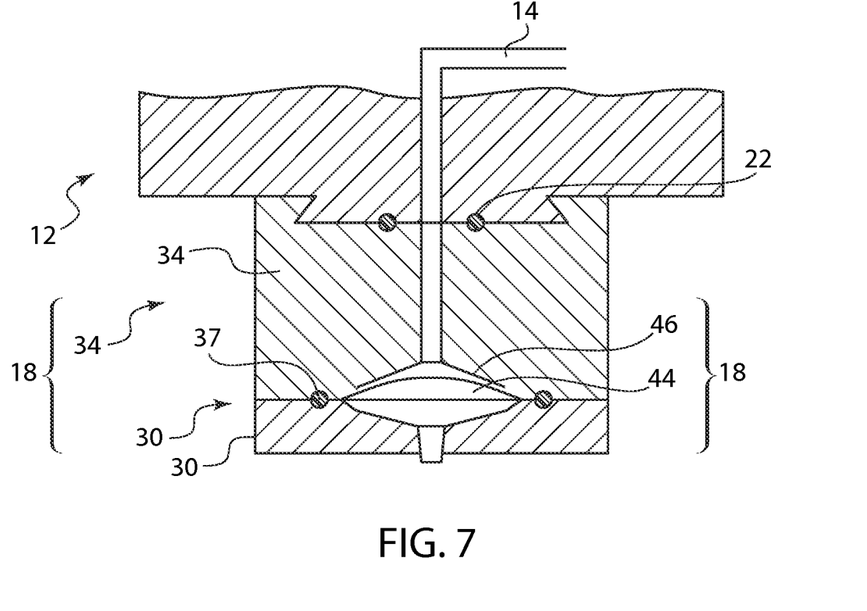
FIG. 7 shows a side plan view of an alternate embodiment of a base and an interchangeable brewing interface component in a secured configuration.

Brewing interface component 18 is also shown as having a lower portion 30. Lower portion 30 is designed to allow insertion of a pod or capsule into holder portion 24. In a specific example, lower portion 30 has a grid 32 or other feature capable of puncturing a pod or capsule containing a ground product, such as espresso powder or coffee grounds. Example of an alternate potential grid shape or design is shown in FIG. 6. The general intent is to provide a raised feature that can be compressed in order to puncture foil or other covering for the pod or capsule. It should be understood that the actual geometry of this component will be unique depending upon the product used and will be designed as necessary for different brewing interface components.

Lower portion 30 may also be designed so that it can be moved to the side in order to allow a pod 42 or capsule 26 to be received by and into holder portion 24. Lower portion 30 can then be closed in order to maintain the pod 42 or capsule 26 in place. In a specific example, lower portion 30 is hingedly connected to the main body 34 of the brewing interface component 18 at hinge 36. In use, lower portion 30 hinges away from the body 34 to allow placement of the pod and then hinges back and locks to its position below body 34 (and below pod) so that the grid may help puncture the pod for a successful brewing process. Alternatively, lower portion 30 may be provided as a drawer-type mechanism, such that it slides in and out from the main body 34. It may also be secured via a dove tail slot or any other appropriate securing feature that allows a capsule or pod to be positioned and held securely into the holder portion 24 of the main body 34.

A mechanism is provided that forces lower portion 30 up into the above holder portion 24, which forces the capsule to be firmly held in place, as well as causes the grid to puncture the capsule. A seal 37 may also be provided between the lower portion 30 and the main body 34 in order to prevent escape of steam and/or water.

Figure 1:
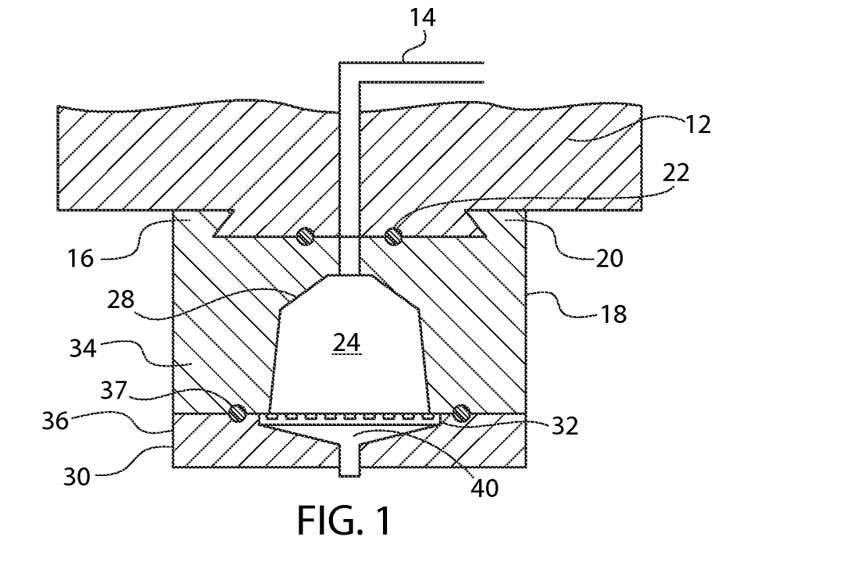
FIG. 1 shows a side plan view of one embodiment of a base and an interchangeable brewing interface component in a secured configuration.
Figure 2:
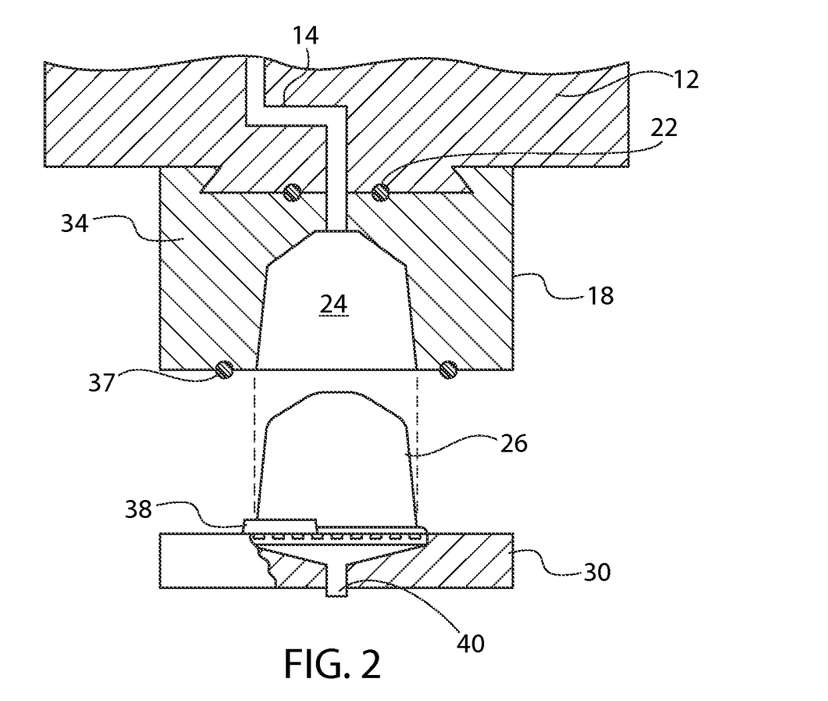
FIG. 2 shows an exploded view of the system of FIG. 1, with a capsule to be loaded or removed from the holder portion.
Figure 3:
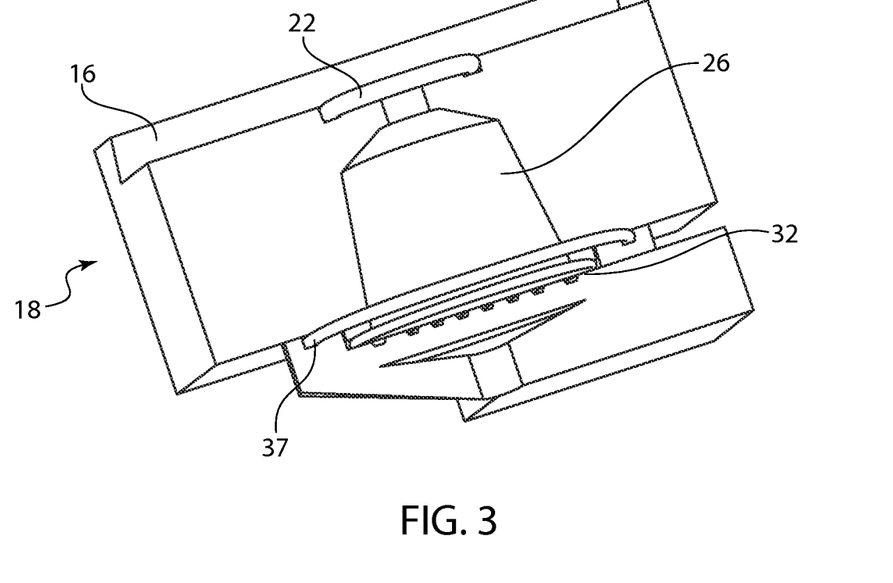
FIG. 3 shows an alternate view of the system of FIG. 1, with a capsule in place.

FIGS. 2 and 4 also illustrate a capsule stop 38, which may be provided in order to properly align and maintain the capsule in place during motion of lower portion 30. An outlet 40 for the espresso or other coffee drink is provided at the lowermost portion of lower portion 30.

Figure 8:
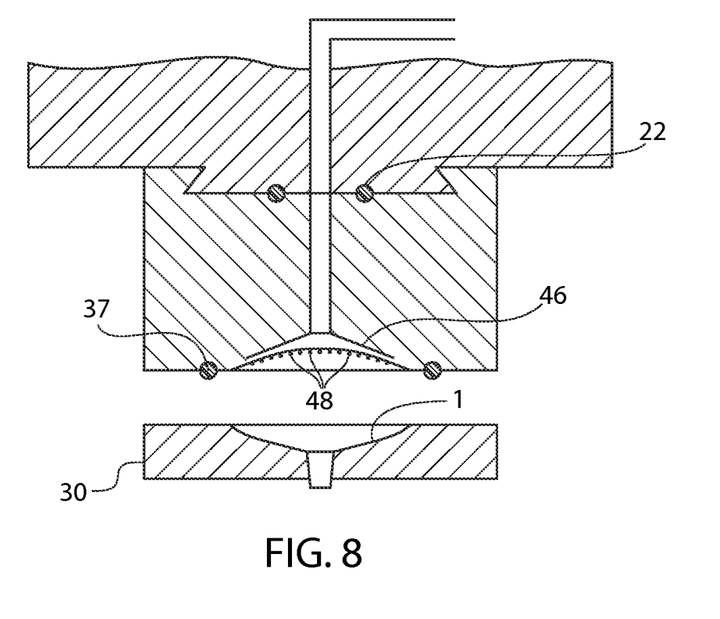
FIG. 8 shows an exploded view of the system of FIG. 7, prior to placement of a pod.
Figure 9:
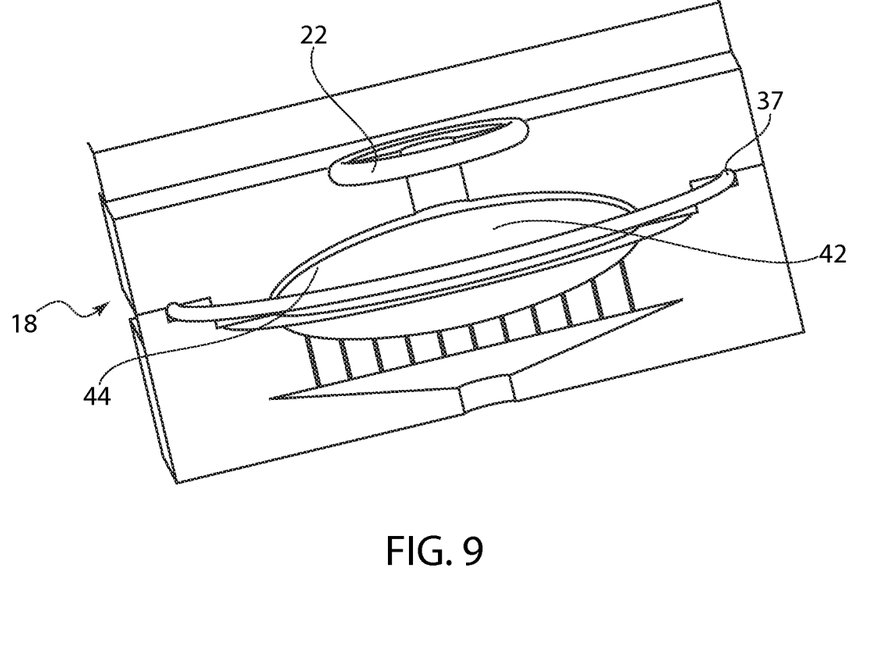
FIG. 9 shows an alternate view of the system of FIG. 7, with a pod in place.
Figure 10:
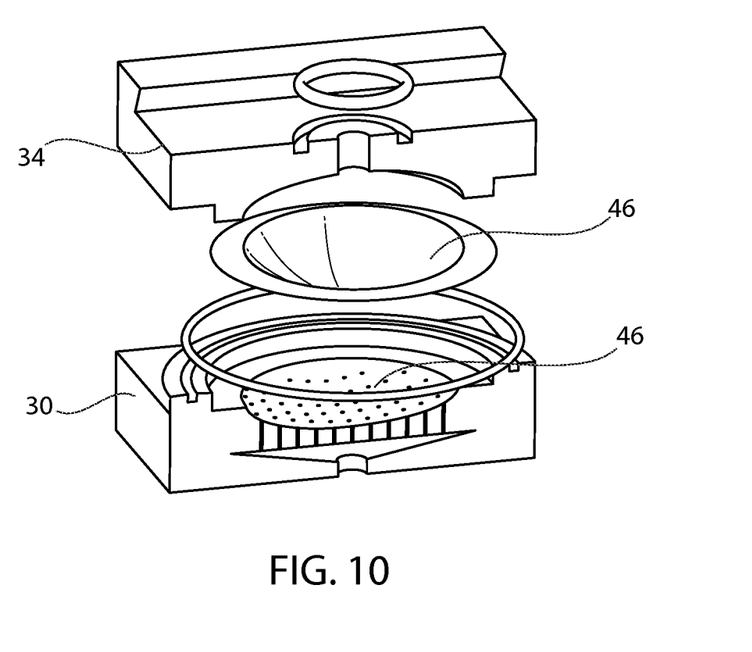
FIG. 10 shows an exploded view, indicating the location of seals and water distribution grid.
Figure 11:
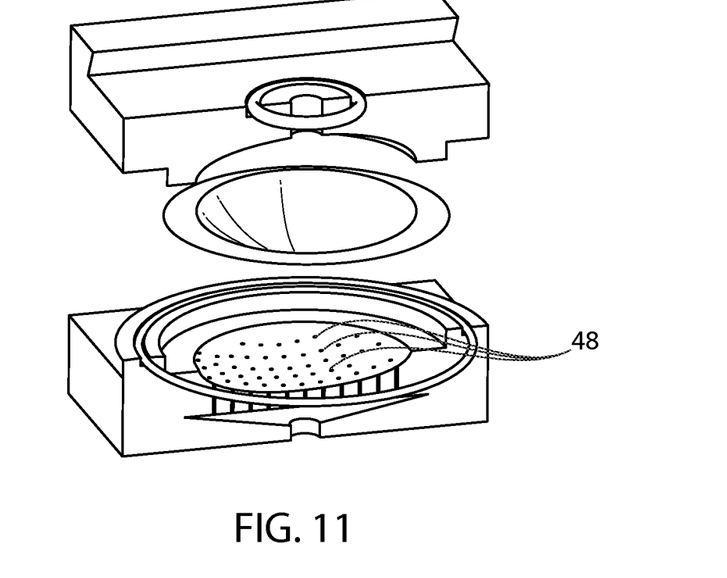
FIG. 11 shows an alternate view of the brewing interface component with the seals positioned.
Figure 12:
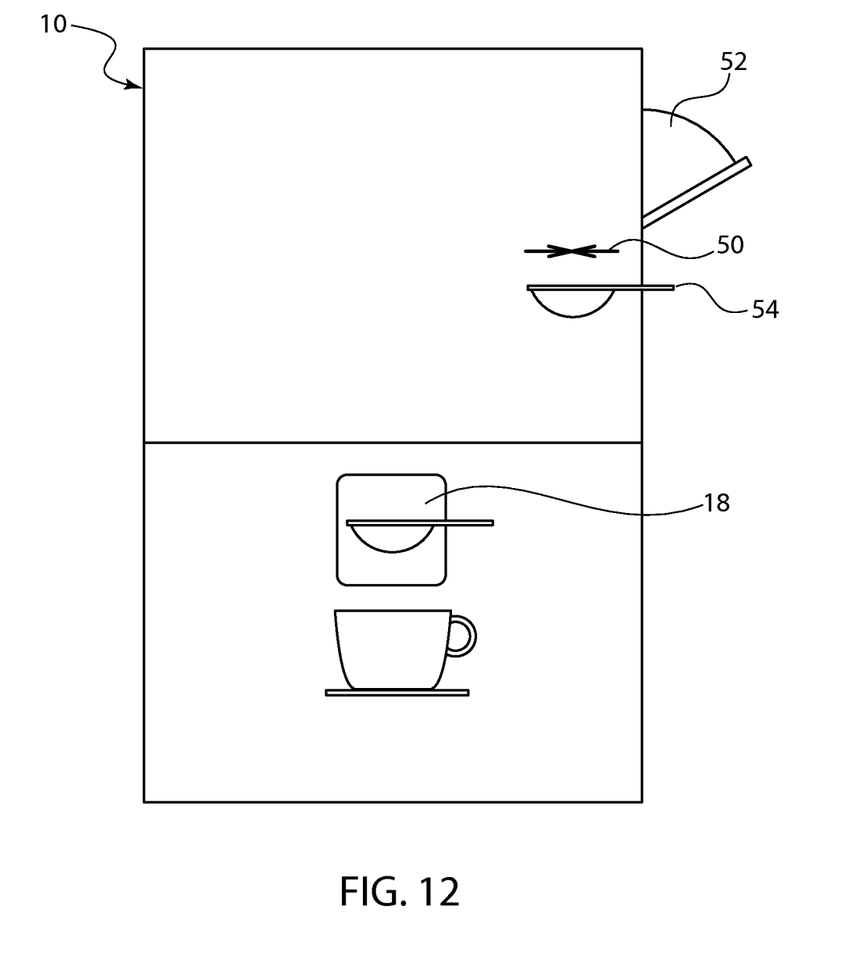
FIG. 12 shows an alternate embodiment having a built-in grinder.
Figure 13:
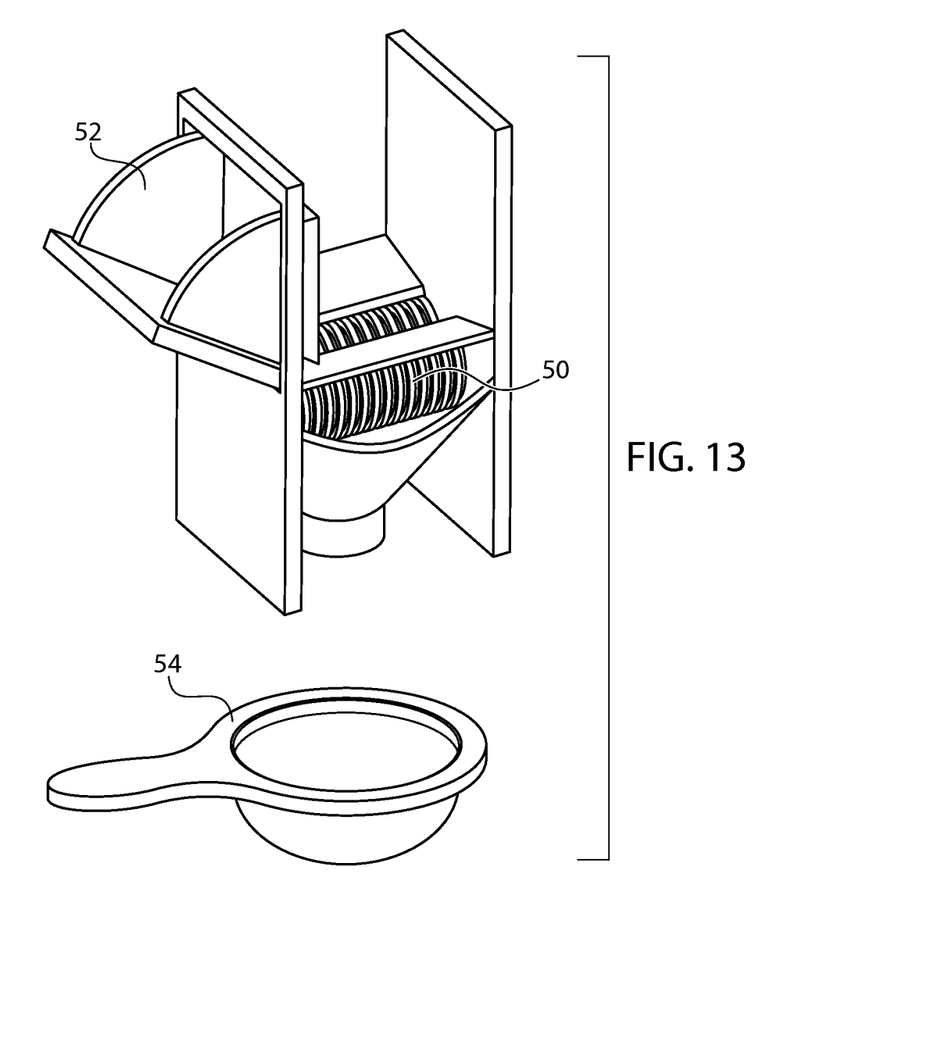
FIG. 13 shows a side perspective view of one embodiment of a built-in grinder and opening chute.
Figure 18:
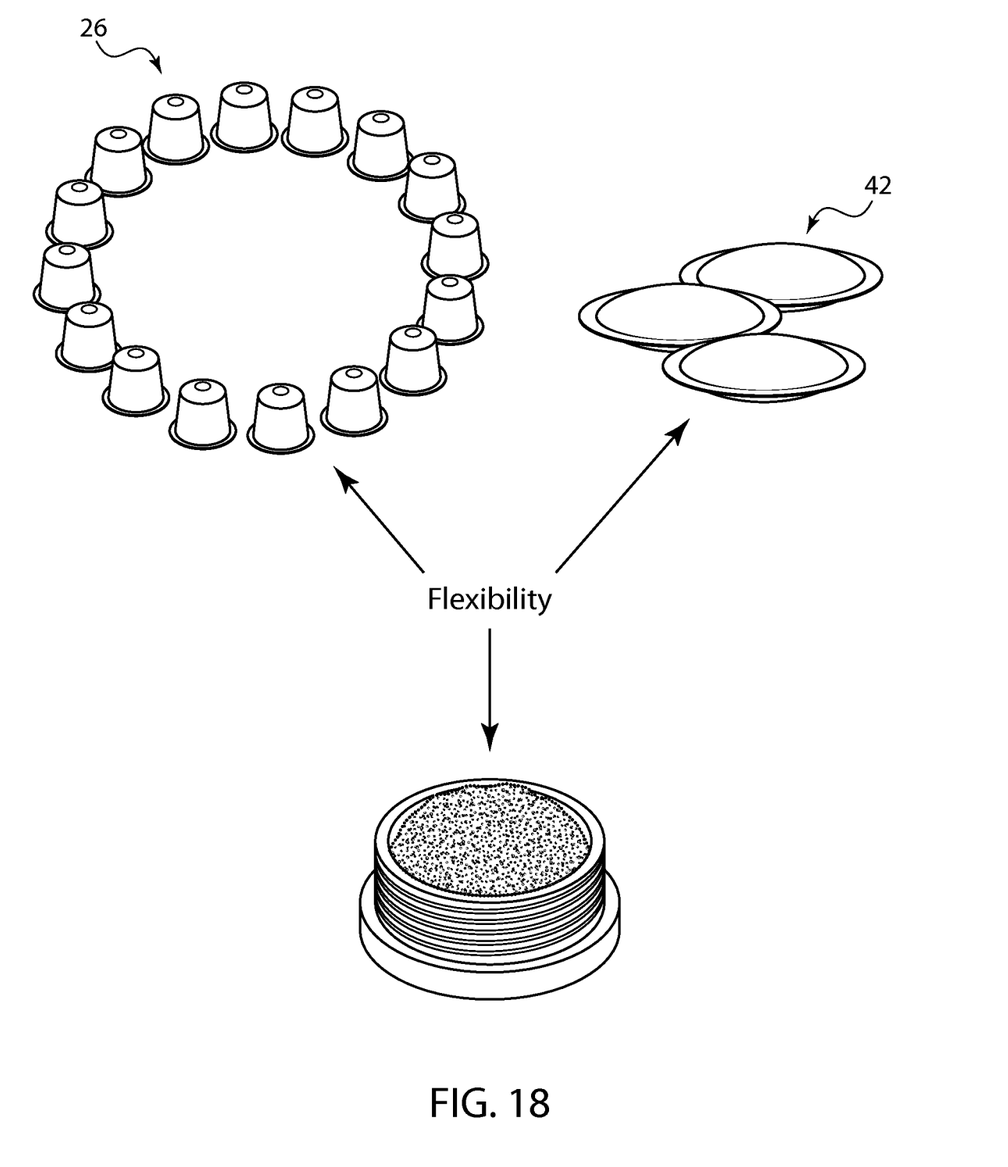
FIG. 18 illustrates the interchangeability offered by the systems described herein.

FIGS. 7-11 illustrate an alternately-shaped brewing interface component 18. Once of the benefits of providing a removable brewing interface is that it can be interchanged for a different brewing interface that is used for a different packaging type (for the espresso powder/coffee grounds). In other words, there is provided an additional brewing interface component (and in most instances, even more than two brewing interface components) with a holder portion having a configuration that differs from the holder portion of the first brewing interface component. For example, the component 18 shown these Figures is intended for use with a paper pod that contains espresso powder, referred to as an ESE (easy serving espresso) pod 42 (an example of which is shown in FIG. 18). This brewing interface component 18 has like elements indicated by like reference numerals, except that its holder portion 44 has a different shape than the holder portion 24 illustrated by FIGS. 1-5. The holder portion 44 (shown well in FIG. 10) is illustrated as having a flatter, oval-like geometry, which is the desired geometry for the ESE pod, as compared to holder portion 24. This brewing interface component 18 may mount similarly to the earlier described brewing interface, and it may also have a hinged lower portion 30. However, the lower portion does not require a grid, only a support because the ESE does not need to be punctured. Instead, the main body 34 has a water distribution grid 46, which is intended to ensure that water is spread over the entire ESE pod. As shown in FIGS. 8 and 10-11, water distribution grid may have a series of one or more holes 48 or openings that disperse water through the grid 46.

Although two different components are described and illustrated, it should be understood that any number of components 18 having features similar to those described, but having differently shaped holder portions in order to receive a different coffee brewing receptacle, may be used. This allows the machine to accept any number of different types of pre-packaged espresso options from different companies by simply interchanging the brewing interface component. In some instances, the change may be made by the end user, such as the airline attendant or any other machine user. This can allow the decision about the type of pre-packaged espresso powder or coffee desired to be made on-site by a rapid disconnect of one component for another. In other instances, the change may need to be made by an aircraft (or other) mechanic, in the event that securing features such as screws, a friction fit, or another tight/more difficult interchange is used. It should also be noted that the form of the components 18 may deviate from the block form shown, or they may have material removed (or added) from their sides so that they have a more sleek appearance and a lower weight or as may be required for strength.

FIGS. 12-17 illustrate an optional coffee grinding feature, with an accompanying brewing interface component that is designed to accept loose grounds or powder. In this option, the machine has a coffee bean grinder 50 built in to the machine, such that the user may be able to skip the use of a pre-packaged espresso or coffee product, and instead, insert whole coffee beans and grind them to the desired fineness. The machine may have a window, door, chute, or other opening 52 that receives whole beans (or a pre-packaged from of whole beans that is opened internally, such as, by a cutter or other device that may be provided integrally with the machine or from a bean package that is opened externally by the user and inserted into the opening 52). The opening/chute 52 directs the beans to the grinder 50. Grinder 50 may have one or more settings that allow the user to select the level to which the beans should be ground (e.g., coarse, medium, fine, and so forth). Alternatively, the grinder may simply be set to a single non-adjustable setting in order to lower cost and increase ease of use. An espresso catch pan 54 is provided to receive and contain the ground beans. The ground powder is then moved to the brew head portion of the machine 10, either by a mechanical element that transports the powder internally, or by the user removing the ground beans in a small cup that sits in the espresso catch pan 54 and positioning them in the brew head. The brew head of this option is similar to the brewing interfaces described above, but the holder portion is designed to hold loose powder or an espresso holding cup, so it is not required to match a pre-packaged shape.

Figure 14:
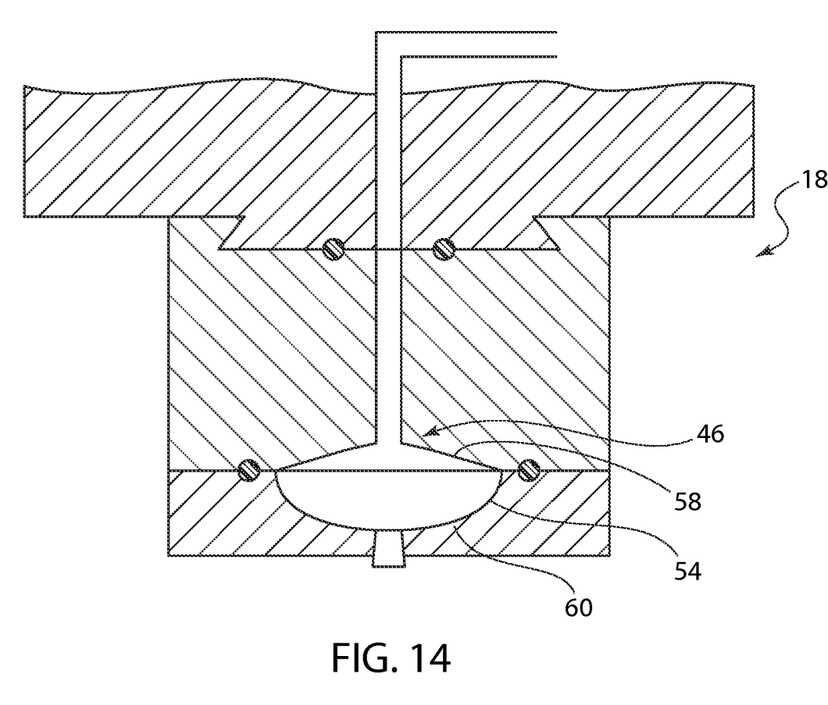
FIG. 14 shows a side plan view of an interchangeable brewing interface component that can be used with the built-in grinder machine.
Figure 15:
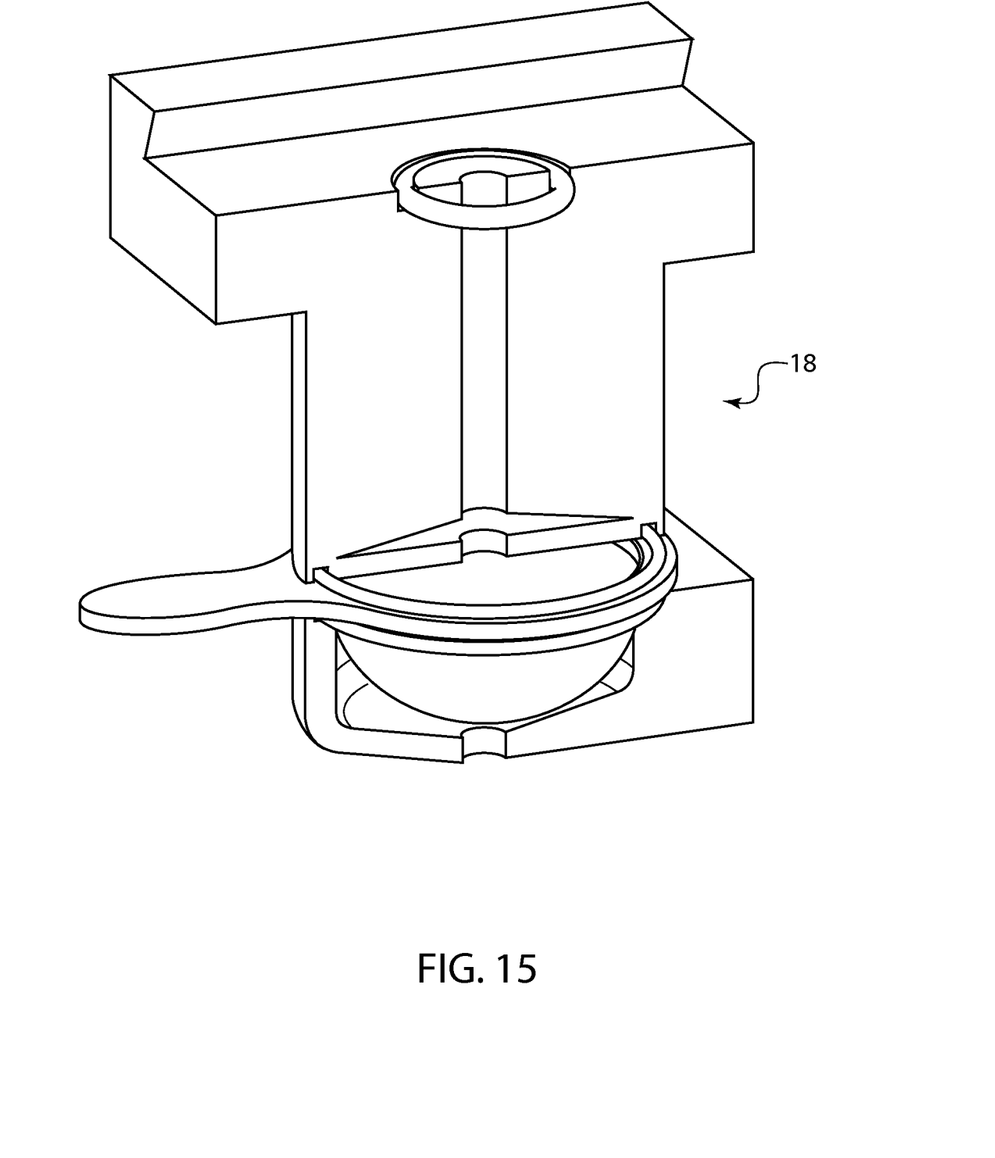
FIG. 15 shows a side perspective view of the interchangeable brewing interface of FIG. 14.
Figure 16:
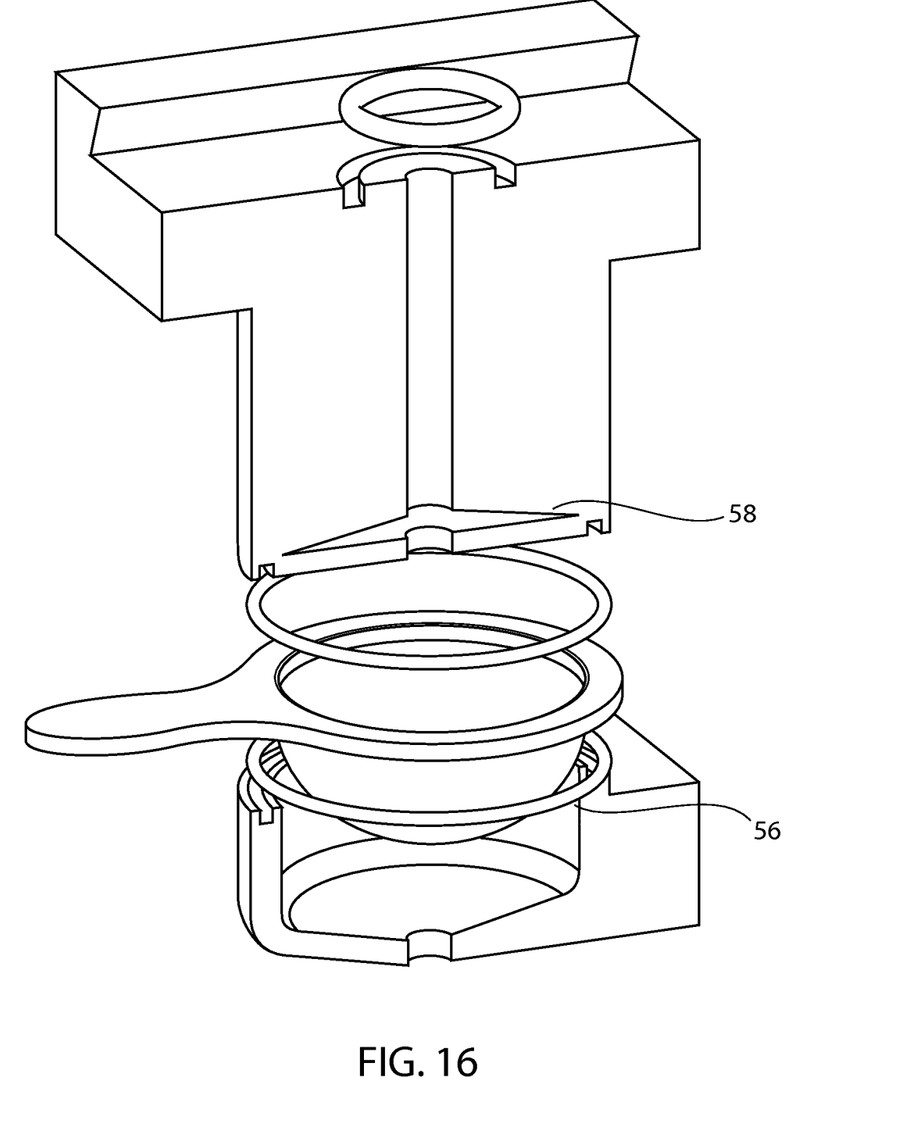
FIG. 16 shows an exploded view of the system of FIG. 14, prior to placement of grounds in the espresso catch portion.

FIGS. 14-16 illustrates the brewing interface component 18 that may be used with the built-in grinder embodiment. This component 18 has similar features to those described above, but its holder portion 56 has an espresso tamping mechanism 58 as well as an optional water distribution grid 46. It also features a catch screen 60, which is designed to capture the loose espresso powder and prevent granules from escaping into the brewed cup. This embodiment may also have a removable cup to allow easy disposal of the ground espresso after brewing.

Figure 17:
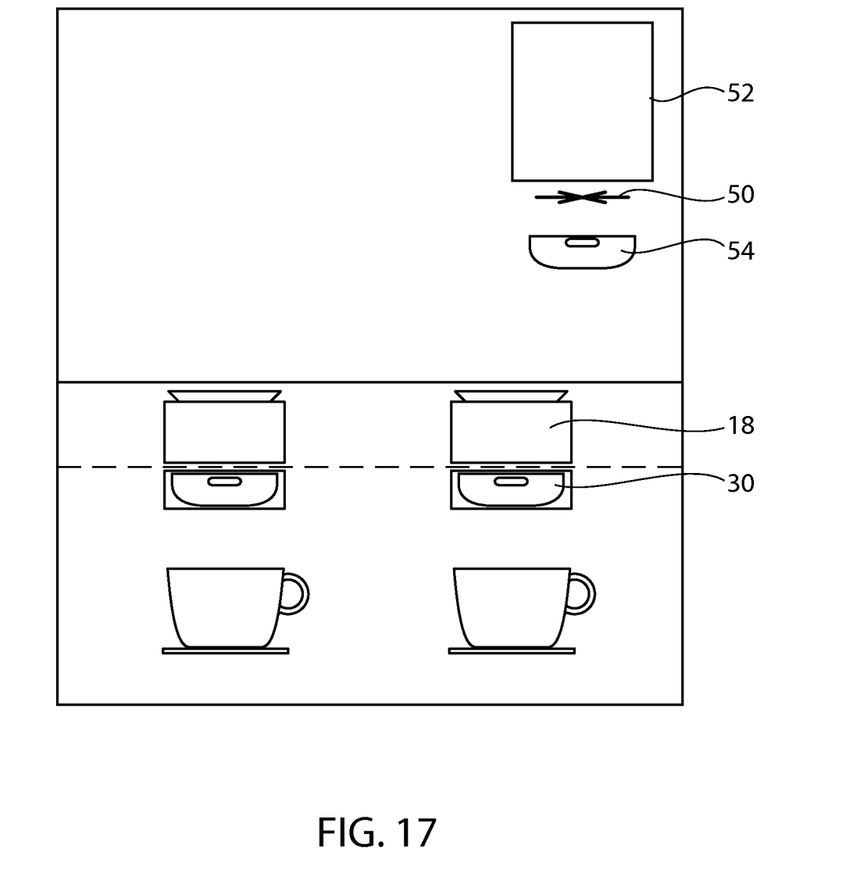
FIG. 17 shows a front view of one embodiment of a built-in grinder machine.

As shown in FIG. 17, more than one cup of espresso may be brewed at a time. For example, the embodiment of the machine shown is capable of brewing two cups at a time, however, a single cup machine may use this same feature. This is envisioned with the built-in coffee grinder embodiment, but a dual cup (or single cup or more than a single or dual cup) brewing feature may be provided on any of the described machines. They may each brew using the same brewing interface component 18 or they may brew using components 18 having holder portions that are differently shaped in order to receive varying forms of espresso powder/coffee.

It is also possible for the machine to recognize the type of coffee system being loaded (e.g., whether capsules, pods, loose grounds, or some other coffee packaging system) and load the related parameters. For example, the brewing interface components may all be internal to the machine and may be positioned on a rotatable or otherwise movable base or block (that contains many, if not all of the optional brewing interfaces) that can automatically adjust the parameters. The system can adjust the interface, the water flow, the volume, the rate, and/or temperature of the water through the block and capsule in order to provide the best flavored coffee drink possible. In a particular embodiment, the block can communicate with the machine through a mechanical feature, such as a series of small rods in the back of the block, that either engage one sensor or another so that the machine registers which brewing interface and which coffee system/option has been positioned. Alternatively, the connection could be an electrical connection that registers the coffee packaging system and registers which brewing interface should be used. A user interface could be provided that allows the user to indicate the type of coffee selected. A memory and internal computer system may be provided with instructions to rotate or move the appropriate brewing interface into place.

Changes and modifications, additions and deletions may be made to the structures and methods recited above and shown in the drawings without departing from the scope or spirit of the invention and the following claims.

What is claimed is:

1. An espresso or coffee drink machine designed to accept more than one brewing interface component, comprising:

(a) a base component comprising an interface connection;

(b) a first brewing interface component comprising (i) an upper main body holder portion with a cavity for receiving a particularly-shaped grounds holder, (ii) a lower portion for supporting the grounds holder, the upper main body holder portion and the lower portion being hingedly or slidably connected to one another to enclose the grounds holder, and (iii) a securing feature on the upper main body holder portion securing the first brewing interface component to the interface connection of the base component, wherein securement between the interface connection of the base component and the securing feature of the brewing interface component creates a fluid tight path for water to pass from the base component to the first brewing interface component; and (c) an additional brewing interface component comprising an upper main body holder portion having a cavity with a configuration that differs from the cavity of the upper main body portion holder portion of the first brewing interface component, wherein the first brewing interface component and the additional brewing interface component are interchangeable in the drink machine.

2. The machine of claim 1, wherein the base component is mounted in an aircraft galley.

3. The machine of claim 1, further comprising a seal between the interface connection and the securing feature.

4. The machine of claim 1, wherein the lower portion of the first brewing interface component is openable away from the upper main body holder portion of the first brewing interface component via a drawer-like mechanism for insertion of a coffee grounds holder.

5. The machine of claim 1, further comprising a seal between the upper main body holder portion of the first brewing interface component and the lower portion of the first brewing interface component.

6. The machine of claim 1, wherein the lower portion of the first brewing interface component comprises a grid for puncturing a capsule containing a ground product.

7. The machine of claim 1, wherein the lower portion of the first brewing interface component comprises a capsule stop.

8. The machine of claim 1, wherein the lower portion of the first brewing interface component comprises an outlet.

9. The machine of claim 1, wherein the upper main body holder portion of the first brewing interface component comprises a water distribution grid.

10. The machine of claim 1, wherein the lower portion of the first brewing interface component comprises a tamping portion and a catch screen.

11. The machine of claim 1, wherein the espresso or coffee drink machine further comprises a built-in bean grinder.

12. The machine of claim 1, wherein the lower portion of the first brewing interface component is openable away from the upper main body holder portion of the first brewing interface component via a hinged mechanism for insertion of a coffee grounds holder.

13. The machine of claim 1, wherein the upper main body holder portion of the first brewing interface component is shaped and configured to contain a capsule.

14. The machine of claim 1, wherein the upper main body holder portion of the first brewing interface component is shaped and configured to contain an easy serving espresso pod.

15. An espresso or coffee drink machine designed to accept more than one brewing interface component, comprising:
(a) a base component comprising an interface connection;
(b) a first brewing interface component comprising a main body, said main body comprising:
(i) a holder portion for receiving a ground product holder;
(ii) a securing feature securing the first brewing interface component to the interface connection of the base component, wherein securement between the interface connection of the base component and the securing feature of the holder portion creates a fluid tight path for water to pass from the base component to the first brewing interface component; and
(iii) a lower portion suitable for supporting the ground product holder into the holder portion, wherein the lower portion is openable to provide access to the holder portion so as to permit insertion of the ground product holder into the holder portion
(c) an additional brewing interface component comprising a holder portion with a configuration that differs from the holder portion of the first brewing interface component wherein the additional brewing interface component is interchangeable with the first brewing interface component.

* * * * *